April 23, 1940. E. G. STAUDE 2,198,066
ADHESIVE APPLYING MECHANISM FOR ENVELOPE BLANKS AND THE LIKE
Filed July 29, 1938 8 Sheets-Sheet 1
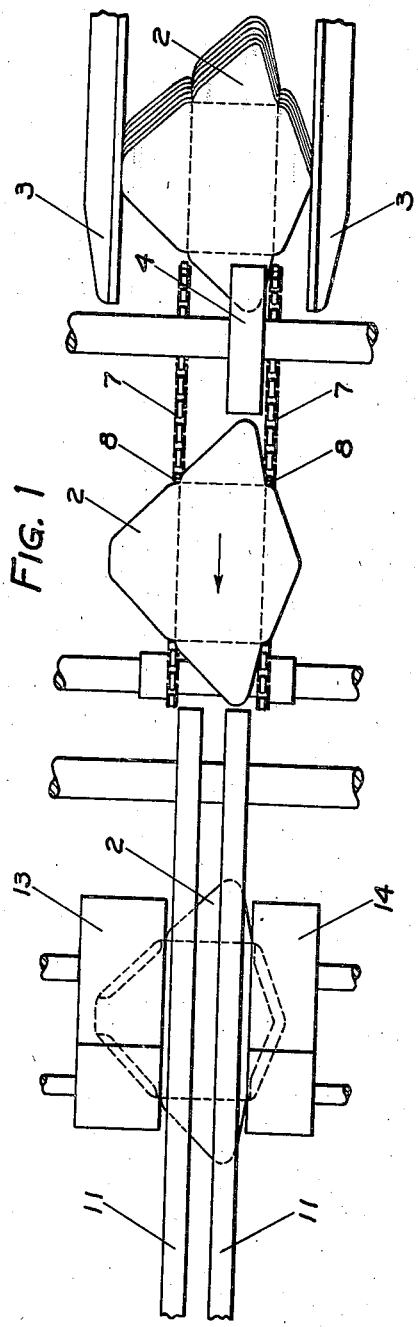
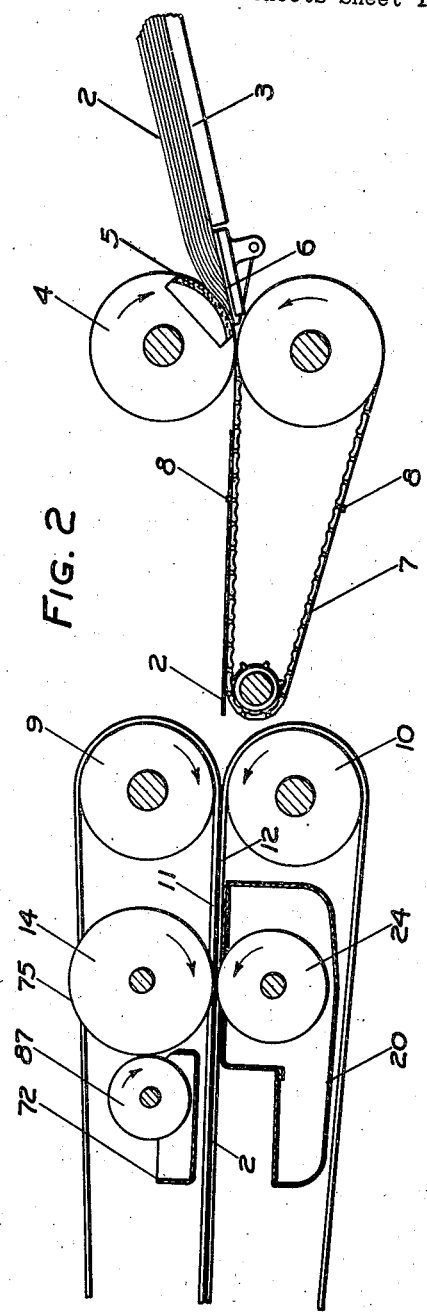
INVENTOR
EDWIN G. STAUDE
By Harold Olsen
ATTORNEYS

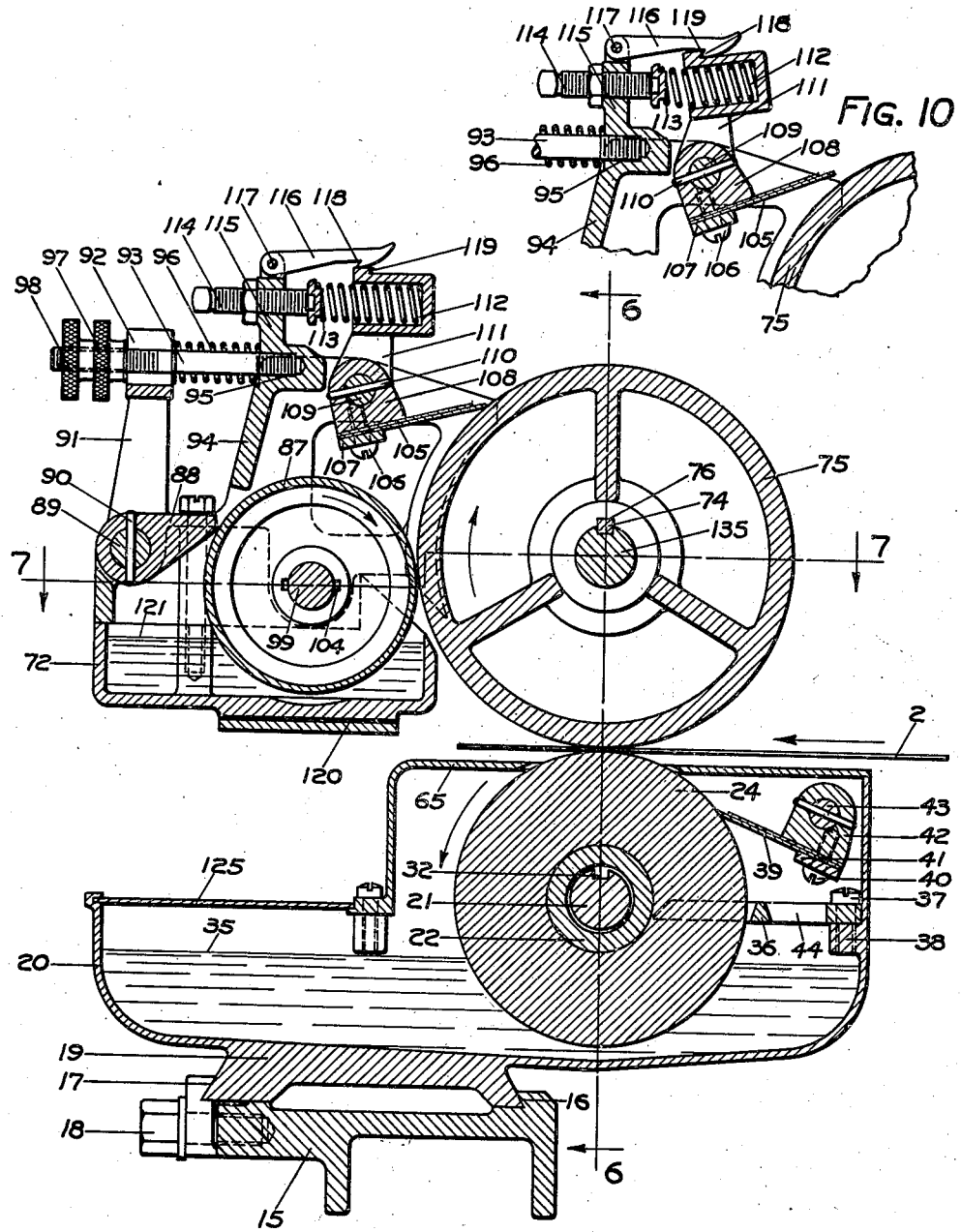

April 23, 1940.　　　　　E. G. STAUDE　　　　2,198,066
ADHESIVE APPLYING MECHANISM FOR ENVELOPE BLANKS AND THE LIKE
Filed July 29, 1938　　　8 Sheets-Sheet 4

INVENTOR
EDWIN G. STAUDE
BY Harold Olsen
ATTORNEYS

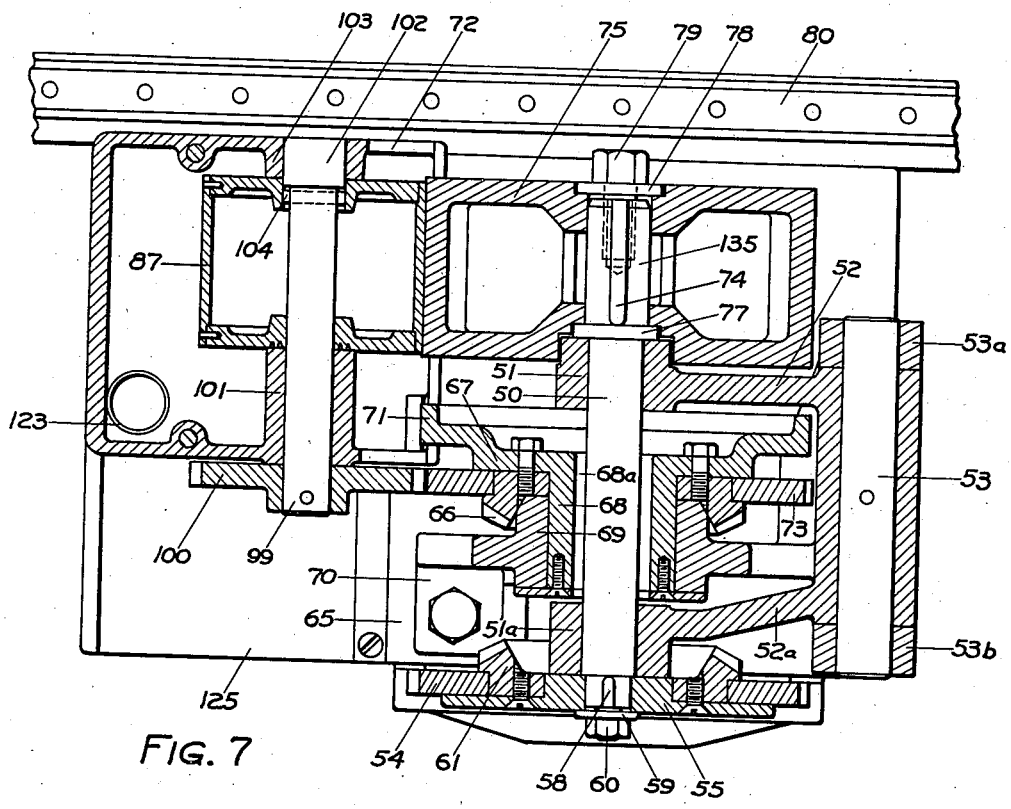
Fig. 7
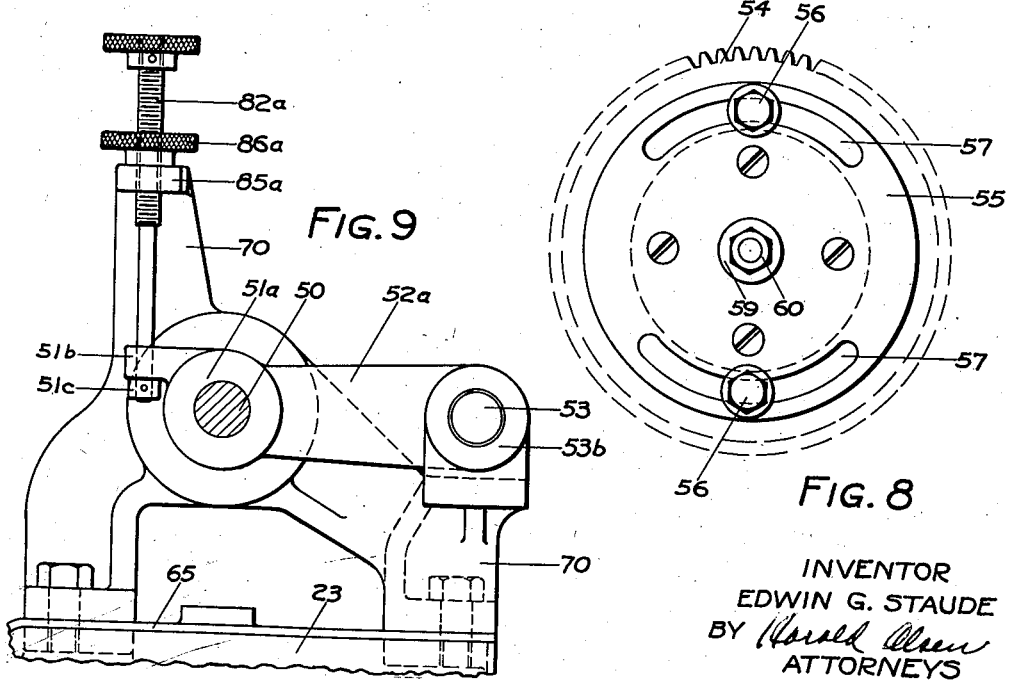
Fig. 9
Fig. 8
INVENTOR
EDWIN G. STAUDE
BY Harold Olsen
ATTORNEYS April 23, 1940.   E. G. STAUDE   2,198,066
ADHESIVE APPLYING MECHANISM FOR ENVELOPE BLANKS AND THE LIKE
Filed July 29, 1938   8 Sheets-Sheet 5

INVENTOR
EDWIN G. STAUDE
BY Harold Olson
ATTORNEYS

April 23, 1940.   E. G. STAUDE   2,198,066
ADHESIVE APPLYING MECHANISM FOR ENVELOPE BLANKS AND THE LIKE
Filed July 29, 1938    8 Sheets-Sheet 7

INVENTOR
EDWIN G. STAUDE
BY Harold Olsen
ATTORNEYS

April 23, 1940.　　　　　E. G. STAUDE　　　　　2,198,066
ADHESIVE APPLYING MECHANISM FOR ENVELOPE BLANKS AND THE LIKE
Filed July 29, 1938　　　8 Sheets-Sheet 8
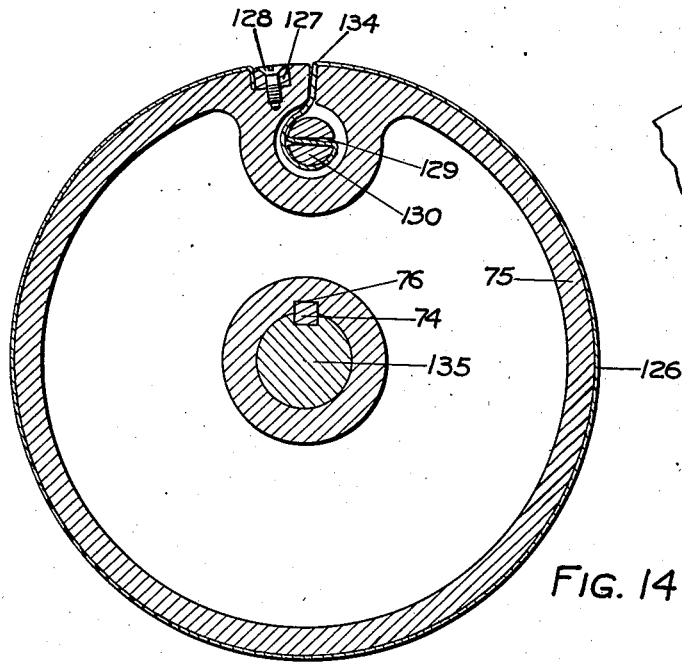
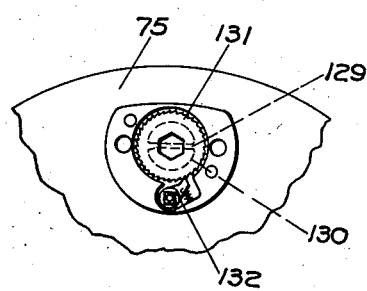
FIG. 15
FIG. 14
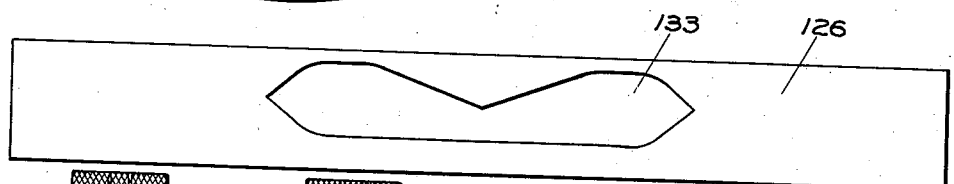
FIG. 16
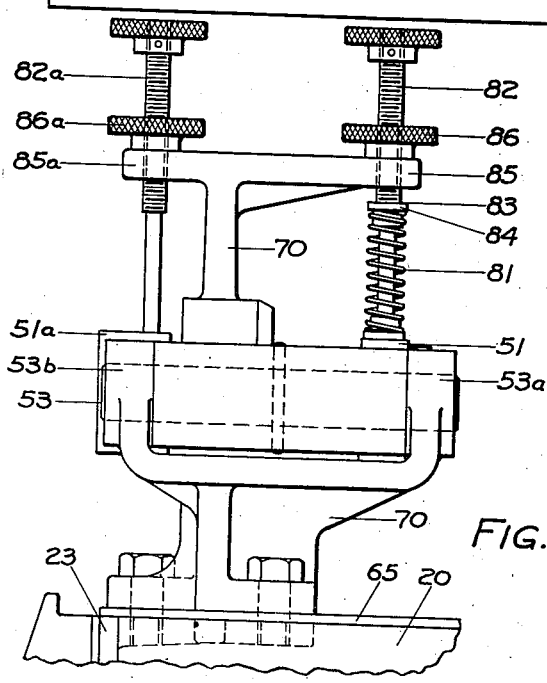
FIG. 17
INVENTOR
EDWIN G. STAUDE
BY Harold Olsen
ATTORNEYS Patented Apr. 23, 1940

2,198,066

UNITED STATES PATENT OFFICE 2,198,066

ADHESIVE APPLYING MECHANISM FOR ENVELOPE BLANKS AND THE LIKE

Edwin G. Staude, Minneapolis, Minn.

Application July 29, 1938, Serial No. 221,988

19 Claims. (Cl. 91—50)

This invention relates to adhesive applying devices and has among its primary objects the production of a mechanism which prints the adhesive on the article by intaglio engraved means either from a separate flexible sheet or from an engraved cylinder.

A further object is to provide a mechanism which is capable of transferring adhesive from a supply reservoir in continuous, uniform and proper quantity, using what is needed and returning the surplus to a supply reservoir, and keeping the adhesive in circulation to thereby prevent drying and caking of the adhesive on the surfaces.

A further object is to supply an adhesive mechanism in which there is provided a firm, solid, moving surface or impression cylinder for holding the blank firmly against a glue applying cylinder, or against an engraved cylinder or drum, thereby obtaining an intaglio printing action by the adhesive applying cylinder or drum, instead of applying the adhesive by flowing the same on to the blank in narrow amounts greater than required, and then depending on the adhesive squeezing out to make the desired seal.

A further object is to provide an adhesive applying mechanism which shall have an automatic, uniform, predetermined, fixed volume to be transferred to the blank or article.

In this respect particular attention is called to the fact that with my device the adhesive can be intaglio-printed clear out to the very edge of the blank, both on the sealing flap and the bottom flap, to make a tight seal clear to the edge without any danger of adhesive squeezing or flowing out and adhering to the adjacent material.

For the past fifty years envelope makers have tried to obtain a practical high speed machine that will apply adhesive on the bottom flap uniformly so that when folded the adhesive will hold and seal the bottom flap clear to the outside edge, thereby leaving no ungummed surface under which foreign matter may accumulate and under which frequently other blanks or envelopes will catch in assembling. With my device I am now able to accomplish this desirable result in a manner hereinafter described.

I also claim as features, pumping means for transferring adhesive from a lower reservoir to be maintained at uniform level in an upper reservoir, and for causing surplus adhesive to flow back to the lower reservoir, it being understood that a very valuable application of my mechanism is directed to applying adhesive on the upper side of the blank.

An important object of my invention is to provide a mechanism which may be quickly adapted for applying adhesive of different outline, either by substituting a properly engraved cylinder or drum, or by substituting a properly engraved flexible sheet of material which can be quickly secured on the periphery of the cylinder or drum. I have found that a thin film of adhesive is ample, and in order to get the proper outline for the back flap or the sealing flap, a thin, flexible sheet may be used and in it can be cut or punched the outline required. The thickness of the flexible sheet determines the amount of adhesive required.

I may wind and properly secure such a thin, flexible sheet around a fully engraved adhesive applying member and cover up where I do not want the adhesive to print, and then wipe off the surface of the thin, flexible sheet by a suitable doctor blade, leaving only the adhesive where the engraving is exposed.

In my method I may even dispense with the engraving on the adhesive applying member, since the adhesive will fill in the open space in the thin, flexible material and adhere to the blank or article when subjected to suitable pressure by a suitable impression cylinder.

My invention consists primarily in intaglio engraving on the periphery of a cylinder to the proper depth of the image for the adhesive to be applied, so that the adhesive will penetrate into the part that is etched away, and all surplus can be wiped off by a suitable doctor blade, similar in construction to that used in printing rotogravure.

In order to accomplish this there must be a firm impression cylinder against which the adhesive printing is done, which impression cylinder must also be provided with some device that will prevent the transfer of any adhesive to the impression cylinder in the absence of a blank, and then offset again on the underside of the next blank or article.

To accomplish this there is provided a cylinder or drum in a suitable reservoir, which cylinder contacts with the adhesive in said reservoir and has a smooth surface. A suitable doctor blade keeps the smooth surface absolutely clean at the point before contact with the blank or article. At the same time, since the impression cylinder or drum rotates in the adhesive, it can never become dry and "freeze" or "stick."

The general functioning of my device can best be seen by referring to the drawings, in which—

Figure 1 is a diagrammatic plan view showing a conventional feeder for feeding envelope blanks, and a timing mechanism for feeding the blanks forwardly in timed relation into my adhesive applying mechanism;

Figure 2 is a diagrammatic elevation of the device of Figure 1;

Figure 3 shows the mechanism for applying the adhesive to the upper surface of a blank, and is a vertical section on the line 3—3 of Figure 6;

Figure 7 is a horizontal section on the line 7—7 of Figure 3;

Figure 8 is a detail face view of the adjustable drive gear for the master printing cylinder by which said cylinder may be "timed" quickly in accurate register with the blank;

Figure 9 is a detail elevation, showing mechanism for controlling the position of the adhesive applying member in relation to the impression cylinder;

Figure 10 is a detail section showing mechanism for locking out the doctor blade while exchanging one adhesive applying member for another having a different adhesive applying surface, or for changing one engraved strip for another engraved strip;

Figure 14 is a cross section on the adhesive applying member showing the manner of attaching such a thin, flexible sheet, to the periphery, the design of which sheet may either be engraved or cut-out (see Figure 16);

Figure 15 shows a detail of a ratchet device for holding the thin, flexible sheet material taut after same has been applied and stretched into place on a drum or cylinder, or on a flat surface;

Figure 16 shows a plan view of a thin, flexible sheet with printing design formed by cutting out a piece to provide an opening; and Figure 17 shows a detail view of the scheme of mounting the adhesive applying member, the spring pressure device and the limiting stop.

Figure 4:
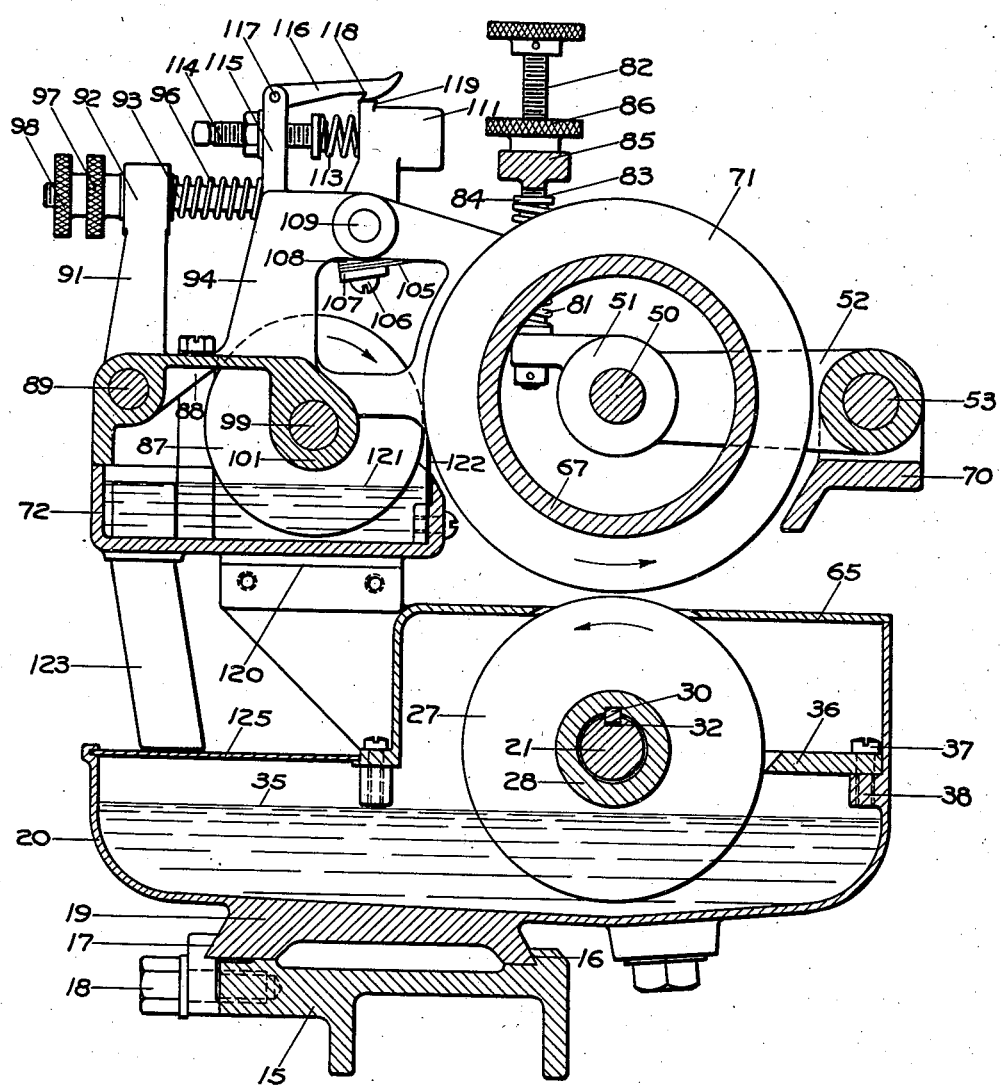
Figure 4 is a vertical section similar to Figure 3, but taken on the line 4—4 of Figure 6, showing the manner of transferring the adhesive from the lower reservoir to the upper reservoir.

It is understood that in practice I use two separate and distinct adhesive applying mechanisms for applying adhesive to an envelope blank, one unit for printing the adhesive onto the sealing flap, and like that shown in Figure 3, and another similar adhesive applying unit for printing the adhesive onto the bottom flap (see also Figure 1). The reason for the need for two adhesive applying devices is that it is common practice to have an adhesive for the bottom flap which is different in quality from that used on the sealing flap.

It is, of course, understood that the outline of the adhesive may be of any design or configuration necessary for the particular outline, size or shape of the article to which adhesive is applied. For instance, in adapting this mechanism for "open end" envelopes, the adhesive on the sealing flap is, of course, a straight line, and therefore the exact outline of the adhesive depends upon the article to which it is to be applied.

Referring to the drawings, Figures 1 and 2 represent an envelope blank fed from a hopper 3 by means of a feed wheel 4, said feed wheel having the usual friction feed surface 5 coacting with the usual retard member 6, and the timing chain 7 which has pins 8 which engage the blank at the rear and advance the blank in timed relation between pulleys 9 and 10. These pulleys are provided with belts 11 and 12 which advance the blank 2 past a pair of adhesive applying mechanism herein respectively generally designated by reference numerals 13 and 14. After the adhesive has been applied, the blank is then folded in the usual manner, and the adhesive on the sealing flap dried either on a slow moving conveyor against which an air blast is directed, or by the improved device of my copending application, Serial No. 201,045 for Method for applying and drying adhesive, which relates directly to drying of the sealing flap adhesive after application of adhesive thereto.

Referring to Figure 3, the numeral 15 designates a part of the machine mechanism to which my adhesive applying device is attached. This bracket 15 has V guides 16 and 17, and a suitable clamp screw 18 secures base member 19 of an adhesive reservoir 20 as shown. The construction just described permits adjustment of the reservoir laterally or in a direction crosswise of the machine or transverse to direction of feed.

Figure 6:
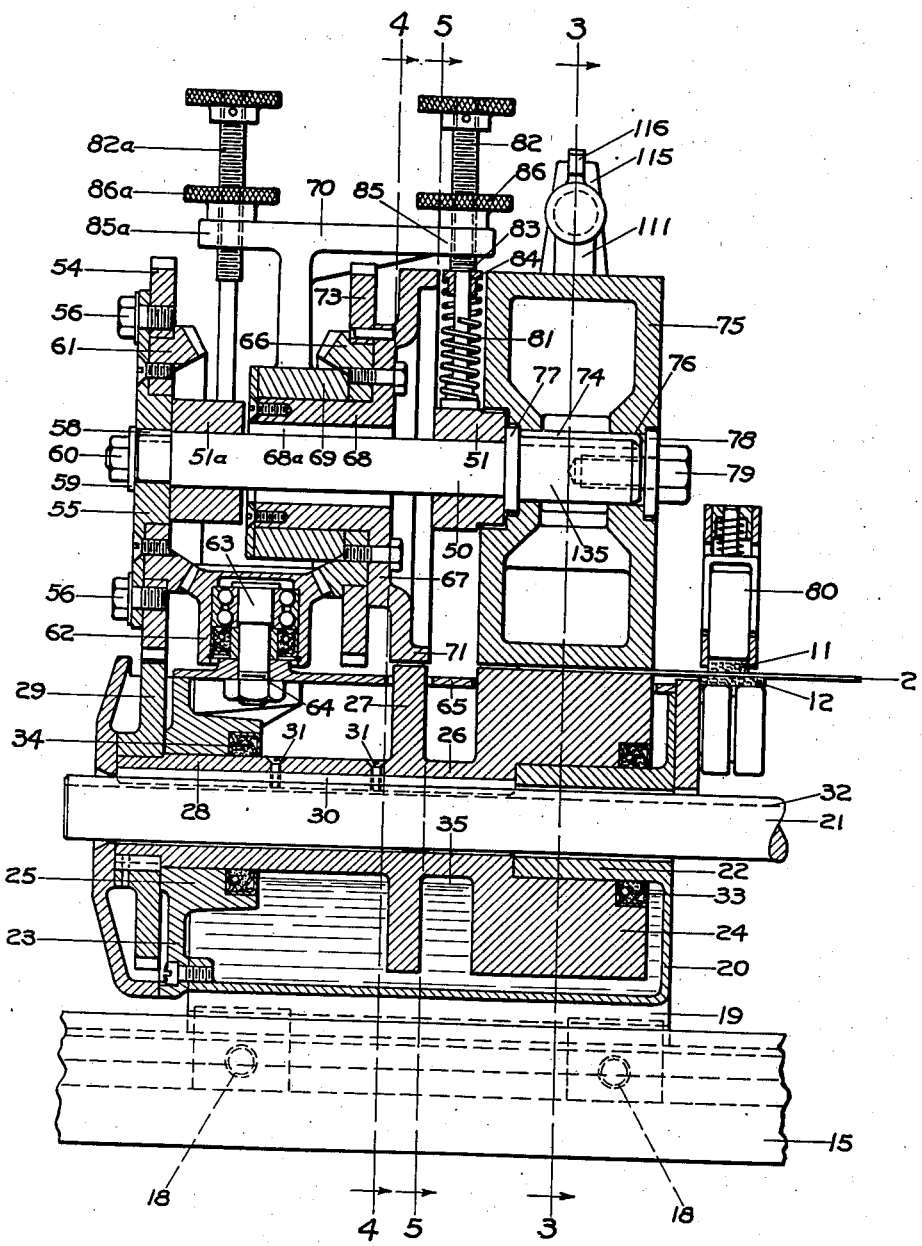
Figure 6 is a vertical section on the line 6—6 of Figure 3.
Figure 11:
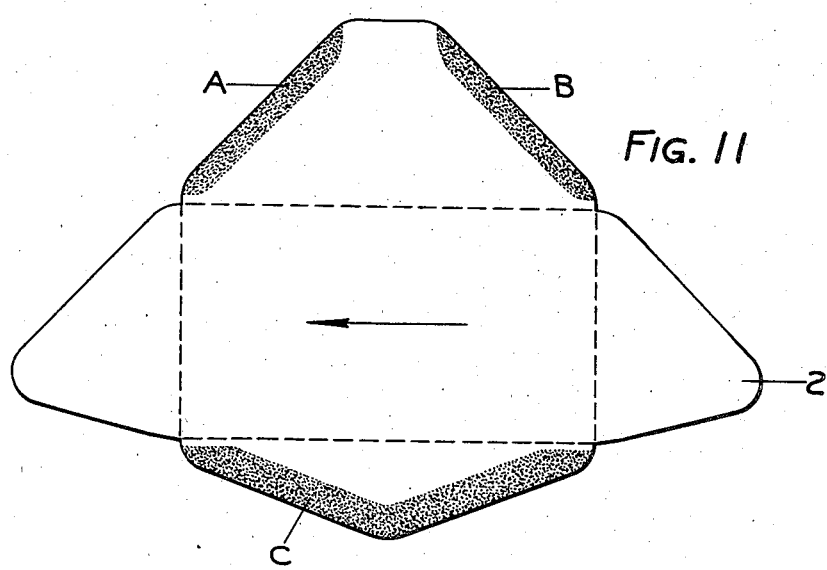
Figure 11 shows an ordinary envelope blank with the adhesive on the bottom flap over areas "A" and "B" with the adhesive applied clear to the edge of the blank, and also shows the adhesive applied at area "C" on what is known as the "sealing flap," at which point the adhesive is likewise printed or applied clear to the edge.

Within the reservoir 20, see Figure 6, is a telescoping drive shaft 21 which is driven from any suitable power source. The reservoir 20 is provided with an integral hub 22 on the right hand wall, and with a loose or removable end plate 23 on the left hand wall.

On the hub 22 is an impression cylinder 24 operating on the outside of the hub 22 which hub serves as bearing for said impression cylinder. At the opposite end is a bearing 25 in the end plate 23, which plate is secured to the reservoir 20 by suitable screws. The impression cylinder 24, see Figure 6, is also provided with an extended hub 26 having an adhesive elevating wheel 27 formed integrally therewith and having a further extended hub 28 which is journalled in a bearing 25. The hub 28 is provided on the outer end with a spur gear 29 secured by a suitable key. A key 30 is secured to the hub 28 by suitable means such as screws 31 and this key is slidable in a keyway 32 of the drive shaft 21. Suitable leak-proof packing is provided at 33 and 34 to keep the adhesive from flowing into the journals provided by the hub 22, and by the bearing 25.

By having the adhesive at the level indicated at 35, see Figure 3, the impression cylinder 24 is constantly immersed in the adhesive. There is provided a fixed scraper 36 to remove most but not all of the adhesive on the periphery and side edges of the impression cylinder 24. This glue scraper 36 is secured by a screw 37 tapped into a lug 38 that is part of the glue reservoir 20. Directly above the impression cylinder 24, I provide a doctor blade 39. This doctor blade 39 is made of a flexible material and similar in construction to blades which are used on rotogravure presses for wiping ink cylinders clean and dry. The blade is mounted by screws 40 and is clamped between a plate 41 and a casting 42, the casting being mounted on a shaft 43 and secured by a suitable pin.

Figure 5:
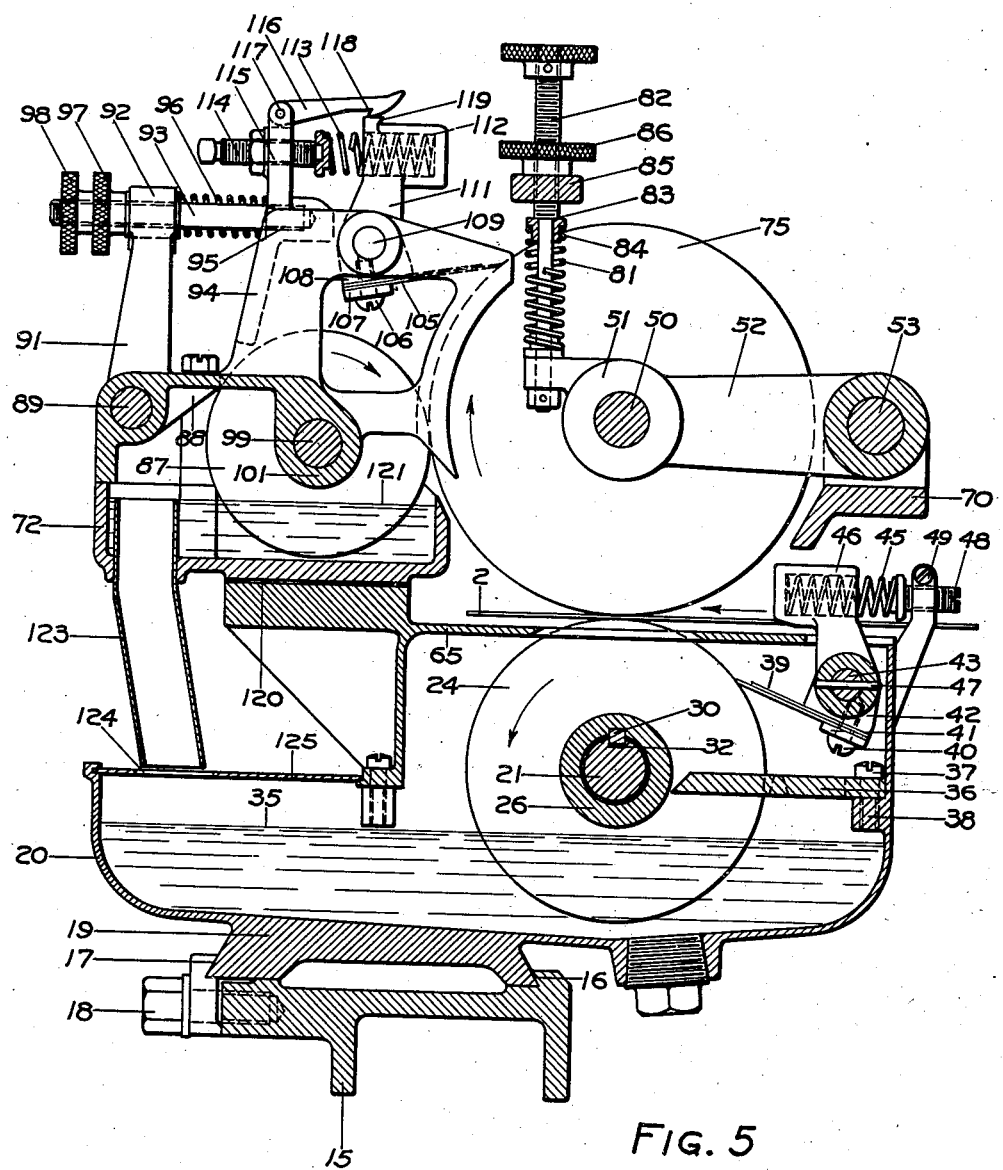
Figure 5 is a vertical section on the line 5—5 of Figure 6 and is therefore similar to Figure 3, except that it shows the outside view and the mounting of the adhesive applying mechanism.

The shaft 43, see Figure 5, holds the blade 39 firmly against the periphery of the impression cylinder 24 by means of a spring 45 acting against an arm 46 secured to the shaft 43 by a pin 47. A tension adjustment 48 is provided consisting of a threaded stud bearing against the spring 45 and clamped in an adjusted position by a screw 49. Referring to Figure 3, the adhesive that is wiped off the impression cylinder 24 by the doctor blade 39 flows through the opening 44 in the scraper 36 back into the reservoir.

Mounted above the shaft 21 is a shaft 50 (see Figures 5, 6, 7, 9 and 17). The shaft 50 is mounted in bearings 51 and 51—a, which bearings are mounted on arms 52 and 52—a which form a yoke that swings on a shaft 53. The shaft 53 is held by lugs 53—a and 53—b. The driven end of the shaft 50 is provided with an adjustable gear 54 (see Figures 6 and 8). The gear 54 is clamped to a hub 55 by means of cap screws 56 tapped into the gear 54 and operating in slots 57 of the hub 55. The hub 55 is keyed to the shaft 50 by a key 58 held in position by a washer 59 and a nut 60. The gear 54 meshes with the gear 29 on the shaft 21. Referring to Figure 6, secured to the hub 55 is a bevel gear 61 meshing with a pinion 62 mounted on a stud 63 that is secured at 64 to a top cover plate 65 of the glue reservoir 20.

Referring to Figures 6 and 7, bevel gear 66 is secured to a member 67. The member 67 is provided with a hub 68 that operates in a bearing 69, which bearing is part of casting 70 secured to the cover plate 65. The hub 68 has an enlarged bore 68—a to give ample room for the adjustment of the shaft 50 without striking the bearing 68. Formed integrally with the member 67 is a glue transfer wheel 71 adapted to coact with the wheel 27 and to transfer adhesive from the wheel 27 to a reservoir 72, see Figure 5, hereinafter described. The member 67 is also provided, see Figure 7, with a fixed gear 73. Mounted on the opposite end of the drive shaft 50 is an extension 135 provided with a key 74, and with an adhesive applying member 75. The member 75 has a keyway 76 to receive the key 74 and is held in position against a shoulder 77 on the shaft 50 by a washer 78, cap screw 79.

Figure 12:
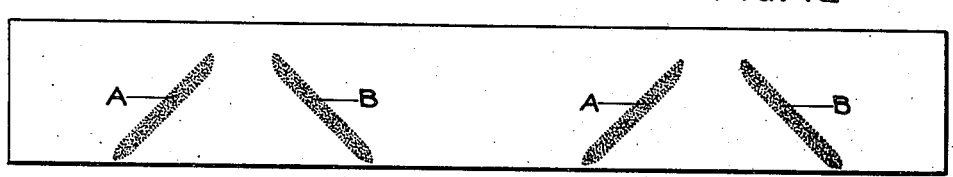
Figure 12 shows the outline of the engraving on a metal strip, or on an adhesive applying member of a size to adapt it for printing on two blanks, per revolution of the adhesive applying member, said engraving being adapted for applying or printing adhesive on the bottom flap.
Figure 13:
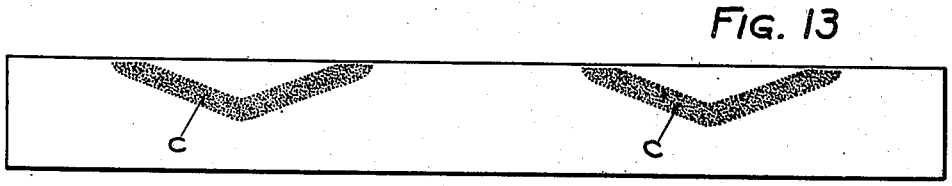
Figure 13 is a view similar to Figure 12 showing an engraved outline adapted for printing on the sealing flap.

In order to interchange the adhesive applying member 75 (see Figure 6) it is only necessary to slide the upper pressure carrier 80 to one side, remove the cap screw 79 and the washer 78 and slip off the adhesive applying member 75 and substitute for it another member having the desired different adhesive outline. This outline has only been shown in Figures 12, 13 and 16 but it will be understood that the member 75 of the other figures has the proper intaglio outline thereon.

To secure the proper transfer pressure or tension between the adhesive applying member 75 and the impression cylinder 24, there is provided a tension spring 81 bearing on the member 51 and adjusted by a threaded bolt 82 having a shoulder 83 and a special washer 84 bearing against the shoulder 83 and against the spring 81. The threaded bolt 82 is threaded in the lug 85 which is a part of the casting 70. A suitable jamb-nut 86 is provided to retain the adjustment.

To act as an adjustment stop for the bearings 51 and 51—a and to prevent injury to the engraving when a blank is not between the members 75 and 24, I provide, see Figure 9, a threaded bolt 82—a operating in a tapped hole in the lug 85—a. The lower end of the threaded bolt 82—a passes through a hole in a lug 51—b which is formed on the bearing 51—a. A collar 51—c is pinned to the lower end of the threaded bolt 82—a and acts to support the weight of mechanism supported by the bearings 51 and 51—a through the lug 51—b. As the threaded bolt 82—a is adjusted by a suitable thumb-wheel to the proper distance between the member 75 and the impression cylinder 24, the jamb-nut 86—a is tightened to maintain its position. After this adjustment is made, the proper tension is then provided by adjusting the threaded bolt 82 by a suitable thumb-wheel, and the spring 81 compressed to the proper degree and then the bolt 82 is secured in adjusted position by the lock-nut 86.

Coacting with the adhesive applying member 75, see Figures 3 and 5, is an adhesive drum 87 which operates in the auxiliary adhesive reservoir 72. The surplus flow of adhesive on the glue drum 87 is controlled by a suitable scraper 88. The scraper 88 is pinned to a shaft 89 by means of a pin 90 and is provided with an arm 91 having a forked member 92 at its opposite end receiving a stud 93 tapped into a member 94 as at 95. A spring 96 is provided between the stationary member 94 and the fork 92, and the thumb-wheel 97 serves to adjust the arm 91 so as to give the proper space between the glue scraper 88 and the surface of member 87. Jambnut 98 secures the thumb wheel 97 in adjusted position. The member 87 rotates in the same direction as the member 75, which means that the meeting surfaces of the two members travel in the opposite direction, and this is accomplished, see Figure 7, by driving the shaft 99, by means of a spur gear 100 which meshes with the gear 73. The shaft 99 has a bearing at 101, that is a part of the framework of the reservoir 72. The shaft 99 has an enlarged end 102 which operates in a bearing 103 and is provided with a pin 104, the ends of which pin fit in suitable key slots in the member 87.

As hereinbefore described, the adhesive applying member 75 is provided with an intaglio engraving on the periphery to correspond with the outline of the adhesive desired on the article to which the adhesive is to be applied. In accordance with my invention it is necessary to wipe the surface of the glue applying member clean and leave the adhesive only in the slight depression that is described as intaglio engraving. To accomplish this, see Figures 3 and 10, there is provided a doctor blade 105 which is secured in a manner similar to that of the doctor blade which wipes the impression cylinder 24. The doctor blade 105 is held by screws 106 passing through plate 107 and entering a member 108, thus clamping the doctor blade. The member 108 is secured to the shaft 109 by a pin 110, and secured to the shaft 109 is an arm 111 having a recess 112 receiving a spring 113, the tension of which is adjusted by means of a set screw 114, threaded in a lug 115 which lug is part of the frame 94. A lever 116 is pivoted at 117 on the lug 115 and has a hook 118 adapted to engage the hook 119 on the member 111 in the manner shown in Figure 10 to hold the doctor blade 105 out of contact with the adhesive applying member 75 while one member 75 is being exchanged for another having a different engraved outline.

The auxiliary reservoir 72, see Figure 5, is mounted in dove-tail grooves at 120, in a manner similar to that of the dove-tail arrangement 16, 17 and 18 of Figure 3. By loosening a cap screw not shown, the auxiliary reservoir may be moved away from the adhesive applying member 75 and the shaft 50, and said movement can disengage the gear 100 from the drive gear 73. In order to keep the level of the adhesive in the auxiliary reservoir up to a point indicated at 121, or at the desired level, I utilize, see Figure 4, an adhesive transfer mechanism including the adhesive elevating wheel 27 coacting with the wheel 71, the adhesive being scraped from the surface of the wheel 71 by a scraper 122. The overflow of the adhesive after the adhesive reaches the level 121, is, see Figure 5, through the pipe 123, and through the opening 124 of the cover 125 and back to the lower reservoir 20. In this way it is clear that a constant circulation of adhesive takes place by means of the member 27 having a surface moving in a direction opposite to the corresponding surface of member 71, the latter picking off the surplus adhesive and transferring the same to the auxiliary reservoir 72.

The operation of my adhesive applying mechanism is as follows:

I have just described how the adhesive level is maintained in the auxiliary reservoir 72. Referring now to Figure 3, the impression cylinder 24 being wiped clean on the surface by the doctor blade 39 will not transfer any adhesive to the article or envelope blank 2 as said blank passes over the impression cylinder, and said cylinder offers a firm foundation against which the blank is pressed by the adhesive applying member 75.

In order to cover the entire surface or periphery of the member 75 (which may have directly engraved thereon the adhesive applying depression, or which may carry a thin metal strip like that shown in Figure 16 and indicated by the reference numeral 126) the adhesive transfer wheel 87 being immersed in the adhesive of the auxiliary reservoir revolves and picks up the adhesive. The amount of adhesive is controlled by the scraper 88. The wheel 87 transfers more adhesive to the surface of the member than is required. The doctor blade 105 is then adjusted to remove all of the adhesive that remains on the surface of the member 75, the only adhesive remaining being that which lies in the engraved depressions.

Thus, when the adhesive filled engraved surface contacts the surface of the article indicated at 2, adhesive will be applied in a clean cut uniform and even manner, the amount and thickness of the adhesive being controlled entirely by the depth and contour of the engraving. In this manner I am able to secure a very thin, solid application or layer of uniform thickness which I can run clear to the edges of the blank, so that when folded over the adhesive will not squeeze out, because no surplus adhesive is applied to the blank or article. In Figure 14 I have shown the thin, flexible material 126 secured by one end to the member 75 by means of a wedge 127 held in place by screws 128. The opposite end of this sheet is threaded through a slot in the member 75 as at 134 and into a slot 129 in the shaft 130. The outer end of the shaft 130, see Figure 15, is provided with a ratchet 131 and a pawl 132 held in contact by a suitable spring. By revolving the shaft 130 the slack is taken out of the flexible material and it is so tightened as to present a smooth, firm surface.

In Figure 16, there is shown a thin, flexible sheet of material with the image cut out as at 133. I may of course provide the intaglio engraving over the entire periphery of the member 75 and cover up the engraving where the adhesive is not required.

I consider myself the first to apply adhesive in this manner and for this purpose. My adhesive mechanism is easy to take apart for cleaning and when assembled and adjusted will work indefinitely without further attention at high speeds. Because the adhesive is in such a thin layer, I have no difficulty resulting from centrifugal action on the adhesive, which in conventional mechanisms starts "spattering" and therefore limits the surface speed.

I do not limit the use of this invention entirely to intaglio printing of the adhesive, since I may apply adhesive to the surface of the adhesive applying member and with the proper flow control of the doctor blades, accomplish a much better job than is now being obtained by conventional adhesive applying mechanisms.

Features of the invention include: All details of construction; the arrangement of upper and lower reservoirs; the scheme for maintaining a predetermined level in the upper reservoir by overflow into the lower; the scheme of keeping the adhesive circulating; the particular relation of the wheels, as well as their direction of rotation with respect to one another and to the fed article; the scheme for adjusting the gear which drives the printing transfer wheel; the printing wheel per se; a glue or adhesive printing wheel formed by means of a strip attached to a drum; the scheme of interchangeability afforded by the use of such a detachable strip; the scheme by which interchange of printing wheels can be made and the timing adjusted at the reservoirs or by a part of the adhesive wheel driving mechanism; and all broader ideas of means inherent in the disclosure.

I also believe it new to print the adhesive solidly from an engraved plate or drum, so that the thickness of the adhesive after application is equal to the depth of the engraved area. By solidly I mean unbrokenly over the entire selected area. I also believe it new to print solidly, adhesive from an engraved plate in which the impression is only the depth of the adhesive, this depth being about .001 of an inch. Although the adhesive has, in the drawing, been represented by stippling, it will be understood that the adhesive as applied by this invention is printed on, in a solid unbroken layer of uniform thickness, which will not "run" after application and which will quickly dry.

I am aware that it is old to drill holes in a drum which revolves in adhesive and apply the glue by means of this drum in what may be termed a stippling effect. However, this leaves adhesive on the article in the form of drops or spots about $\frac{1}{32}$ of an inch high (not .001 of an inch) and these dots of adhesive have to be squeezed flat in order to obtain coalescence or mixture or continuity. The result is that the printing holes cannot be near to the edge of the flap, because the adhesive will squeeze out beyond the edge of the flap. This is avoided by my invention.

It is noted that in joining a thin cellulosic window the thickness of the material of which is only about .00088 of an inch, the only adhesive that will make the cellulose adhere to a box blank is one which is not soluble in water, for example benzol or acetone. My invention lends itself to the use of such solvents, as well as to the use of water.

The adhesive must be thin enough so that when tested between the thumb and the forefinger, by pulling the fingers apart, the adhesive will not string like chewing gum. If it does proper operation will not occur, and gumming of the plates and stringing from the glue wheel will occur.

The depth of the engraving should be from about .001 to .001½ of an inch, and therefore, the thickness of the strip 126 will correspond to these measurements. The surface speed of the blanks through the machine depends upon the particular shape and size of the blank. An average speed of 300 to 400 feet per minute is the minimum on envelope machines. By my invention I can feed at a much faster rate and obtain quick drying and do this without splattering. A speed of 1200 feet per minute is the minimum and is about the top speed for gluing cartons but with my machine glueing and quick drying can be obtained at this speed without splattering. It will be understood that cartons (as distinguished from envelopes) are made of a board that varies from .012 to .030 of an inch in thickness, and therefore can stand a much larger "dab," of adhesive without penetration than can an envelope blank.

In the past it has heretofore been the practice to apply twice as much adhesive over about one-half of the area and then depend upon squeezing out or spreading of the adhesive to cover the entire area or larger surface. This old scheme applies usually to the bottom seal of the envelopes, but on the top seal the glue must also be spread and dried, and heretofore considerable time has been wasted in drying, and uneven application and failure to adequately apply has resulted. By this invention I am able to control these factors substantially perfectly to meet the varying conditions, and without splattering and in a manner to assure even distribution and uniform thickness of the applied layer.

The depth to which the engraving can extend depends only upon the thickness of the layer of the adhesive required which thickness is as before stated about .001 of an inch. If such a thin layer of adhesive were applied to the surface of a glue wheel, it could not be transferred to the blank properly because of the difficulty in getting any glue wheel to run perfectly true. With the construction herein the scraper can flex sufficiently to take care of any slight eccentric motion of the glue wheel and yet do a perfect job.

I claim as my invention:

1. An adhesive applying mechanism for paper blanks including means for feeding said blanks, an adhesive applying member, rotary means for supplying adhesive to said adhesive applying member which means dips into adhesive and is in direct transfer relation with said member, and a doctor blade for regulating the amount of adhesive on said adhesive applying member, and an impression member coacting with said applying member, and between which and said applying member the blanks are fed, said impression member operating in a liquid, and having a doctor blade normally in contact therewith.

2. An adhesive applying mechanism including, an adhesive applying member, an impression member in operative relation with said adhesive applying member, a doctor blade for removing surplus adhesive from said applying member, means supplying adhesive to said impression member, a doctor blade bearing tightly against the surface of said impression member, and a secondary device for removing the bulk of the adhesive from the impression member, said impression member coacting with said adhesive applying member, and means for feeding material between said members.

3. An adhesive applying mechanism for paper blanks including means for feeding said blanks, an adhesive applying cylinder, a thin flexible sheet provided with a cut-out of the image of the adhesive to be applied and removably secured by clamping the same to the periphery of said cylinder, means for supplying adhesive to said sheet and cut-out image, and a doctor blade for regulating the amount of adhesive on said flexible sheet.

4. An adhesive applying mechanism for paper blanks including means for feeding said blanks, an adhesive applying member, means for supplying adhesive to said adhesive applying member, a doctor blade for controlling the amount of adhesive on said adhesive applying member, an impression member coacting with said adhesive applying member and between which the blank is fed, said impression member having a smooth surface, an adhesive reservoir in which said impression member revolves, and means for wiping the adhesive off from the periphery of said impression member.

5. An adhesive applying mechanism for paper blanks including means for feeding said blanks, a primary adhesive reservoir, a secondary adhesive reservoir, means for transferring adhesive from the primary reservoir to the secondary reservoir, an over-flow for returning the surplus from the secondary reservoir to the primary reservoir, an adhesive applying member, means for supplying adhesive to the adhesive applying member from the secondary reservoir, a doctor blade for controlling the amount of adhesive on said adhesive applying member, an impression member located in the primary reservoir and coacting with said adhesive applying member and between which the blank is fed, said impression member having a smooth surface and means for wiping the adhesive off from the periphery of the impression member.

6. An adhesive applying mechanism for paper blanks including means for feeding said blanks, a primary adhesive reservoir, a secondary adhesive reservoir, rotary means for transferring adhesive from the primary reservoir to the secondary reservoir, an over-flow for returning the surplus from the secondary reservoir to the primary reservoir, an adhesive applying member revolving in the opposite direction from that of the rotary means for transferring adhesive from the primary reservoir to the secondary reservoir, means for supplying adhesive to the adhesive applying member from the secondary reservoir, a doctor blade for controlling the amount of adhesive on said adhesive applying member, an impression member located in the primary reservoir and coacting with said adhesive applying member and between which the blank is fed, said impression member having a smooth surface, means including a doctor blade for wiping the adhesive off from the periphery of the impression member.

7. An adhesive-applying mechanism for paper blanks, including means for feeding the blanks, a primary reservoir below the feeding level, a secondary adhesive reservoir above the feeding level, a revolving member mounted in the primary reservoir, a first driving shaft splined to said member, said revolving member having thereon an impression cylinder, a glue transfer wheel and a first gear, a second shaft journaled on said primary reservoir and having thereon an adhesive-applying member cooperative with said impression cylinder, a glue-transfer wheel in transfer relation with the first mentioned transfer wheel and a second gear meshing with the first gear, a third gear surrounding said second shaft but journaled independently of it, a third shaft journaled on the secondary reservoir and having thereon a glue-transfer wheel supplying said adhesive-applying member, said third shaft having a fourth gear in mesh with said third gear, means by which the third gear is driven from the second gear, means for removing the glue from the second glue-transfer wheel and depositing it in said secondary reservoir, said secondary reservoir being mounted upon the primary reservoir, and means supporting said primary reservoir for sliding adjustment with reference to said driving shaft and feeding means, and said feeding means being adapted to feed blanks between said impression cylinder and said adhesive-applying member.

8. A device of the class described comprising a lower reservoir and an upper reservoir, a first wheel in the lower reservoir feeding means adapted to feed the blanks into contact with said wheel, a second wheel over said first wheel and adapted to press blanks against the first wheel while it transfers adhesive to them, means by which the first wheel drives the second wheel including a shaft for the second wheel having a disc thereon, a spur gear rotatable on the disc for adjustment, means releasably securing the gear after adjustment, an upper reservoir, a glue wheel therein in transfer relation with said second wheel, a shaft for said glue wheel, and means by which said last mentioned shaft is driven by said adjustable spur gear.

9. A glue-applying device comprising a glue receptacle having an impression cylinder and an adhesive-applying device cooperative with said cylinder, and comprising a wheel and a thin strip of material encircling and removably held against the working surface of the wheel and having an opening therein defining an adhesive-receiving depression the bottom of which is formed by the surface of the wheel, said depression adapted to receive adhesive and to transfer the same to an article, which passes between said cylinder and said wheel.

10. A device of the class described, a lower reservoir having therein first and second wheels dipping into liquid adhesive in said reservoir, means controlling the amount of adhesive picked up by said wheels, means for moving blanks into engagement with the first wheel, a third wheel having adhesive-receiving depressions therein and arranged over said first wheel to transfer adhesive to a blank which is supported on said first wheel, an upper reservoir, means including a wheel co-operating with said second wheel for transferring adhesive from the lower to the upper reservoir, a fourth wheel dipping into the second reservoir and adapted to transfer adhesive therefrom to the depressions of said third wheel and means regulating the amount of adhesive transferred by said fourth wheel.

11. In a device of the class described, a lower reservoir having first and second wheels driven by a first shaft, said wheels dipping into the adhesive of the reservoir, a second shaft journalled above the first shaft, a third wheel on the second shaft adapted to transfer adhesive to the top surface of the blank while passing between the wheels and supported by the first wheel, a tubular member surrounding the second shaft and journalled independently thereof and having a fourth wheel in adhesive relation with the second wheel, means by which the first shaft drives the second shaft, means by which the second shaft drives said tubular member, an upper reservoir having a third shaft and means by which said tubular member drives the third shaft, said third shaft having a fifth wheel dipping into the adhesive in said second reservoir and adapted to apply adhesive to the working surface of said third wheel, and means for transferring adhesive from the fourth wheel to the upper reservoir, and means by which a predetermined level of liquid in said second reservoir is maintained including an overflow from the upper to the lower reservoir.

12. In an adhesive applying mechanism, a first adhesive pickup wheel, a second adhesive pickup wheel, a third wheel in glue-receiving relation with both pickup wheels and having means thereon for applying the received adhesive over a predetermined area of the article, means for feeding articles between one of the pickup wheels and said third wheel, and means respectively controlling the amount of adhesive on said third wheel and that pickup wheel between which and said third wheel the articles are fed.

13. In an adhesive applying mechanism, a lower glue reservoir having an adhesive pickup wheel, an upper reservoir having an adhesive pickup wheel, a third wheel in direct glue-receiving relation with both pickup wheels and having means thereon for applying the glue over a predetermined area of the article being fed, a doctor blade for the lower pickup wheel, a doctor blade for the third wheel, and means for passing a flat article between the lower pickup wheel and said glue-receiving wheel so that adhesive is applied clear to the edge of an article.

14. In an adhesive applying mechanism, a lower adhesive reservoir having therein an impression cylinder, a doctor blade for said cylinder, an upper reservoir having an adhesive pick-up wheel, an adhesive applying wheel in operative relation with said impression cylinder and pick-up wheel and having means thereon for applying adhesive received from said pick-up wheel over a predetermined area of the article being fed, means for continuously moving adhesive from the lower to the upper reservoir, and an overflow passage leading from the upper to the lower reservoir, and having its intake from the upper reservoir so disposed as to automatically maintain a uniform level of adhesive in said upper reservoir.

15. In an adhesive applying mechanism, an impression cylinder and a doctor blade for said cylinder, an adhesive pick-up wheel, an adhesive applying wheel in operative relation with said cylinder and pick-up wheel and having means thereon for applying adhesive received from the pick-up wheel over a predetermined area of an article, said adhesive applying wheel being detachably fixed to the free projecting end of a drive shaft, means for feeding a blank between said cylinder and said adhesive applying wheel and lying in a plane which is spaced outwardly beyond the free end portion of said drive shaft and said adhesive applying wheel being removable from said shaft by outward axial motion.

16. An adhesive applying mechanism for paper blanks including, an adhesive applying member, a doctor blade for controlling the amount of adhesive on said adhesive applying member, and means whereby said doctor blade may be moved toward and away from doctoring position, said means including a rocking support for the doctor blade, a spring associated with the support means for adjusting the tension of the spring to vary the doctoring tension of the blade, and means whereby the blade can be locked in retracted position against the action of said spring, and without changing the adjusted position of the adjusting means.

17. An adhesive applying mechanism including, an adhesive applying member, an adhesive reservoir having an adhesive transfer wheel mounted thereon, means mounting the reservoir so that it can be moved toward and away from the periphery of said adhesive applying member, a doctor blade for controlling the amount of adhesive on the adhesive applying member and means mounting the blade to move with the reservoir, means for adjusting the doctoring tension of the blade, and means whereby the blade may be moved from doctoring position and then moved into that position while the tension means continues to act and without changing the adjusted position of the adjusting means, whereby the doctor blade may be moved from doctoring position, held in that position, and then the reservoir can be moved away from said adhesive applying member.

18. A glue applying device comprising, a glue receptacle having an impression cylinder, and a glue-applying device cooperative with said cylinder, and comprising a wheel and a strip of material encircling and engaging the working surface of the wheel and having an opening therein defining an adhesive receiving depression, the bottom of which is formed by the working surface of the wheel, means securing one end of the strip to the wheel and means receiving the opposite end and adapted to apply a pulling force to clamp the strip against the working surface of the wheel, said depression adapted to receive adhesive and to transfer the same to an article which passes between said cylinder and wheel.

19. A high speed glue applying device comprising an adhesive applying member having an adhesive receiving depression in its working surface of an area equal to the total area of the surface to be covered by the adhesive and of a configuration corresponding to the desired configuration of that total area to be covered with adhesive, and of a depth not substantially greater than .001 of an inch, means for rapidly feeding an article while holding it in adhesive receiving relation with the working surface of said adhesive applying member, and a doctor blade in doctoring relation with said working surface to remove all adhesive which does not lie within said depression, whereby to cause the adhesive remaining in said depression to be transferred to the article being fed.

EDWIN G. STAUDE.